United States Patent
Sigle et al.

(10) Patent No.: US 11,530,663 B2
(45) Date of Patent: Dec. 20, 2022

(54) METHOD FOR DETERMINING INFORMATION ABOUT A STATE OF A DRIVE MOTOR SYSTEM AND/OR OF A DRIVE BATTERY PACK OF A GARDENING, FORESTRY AND/OR CONSTRUCTION DEVICE, AND SYSTEM FOR DETERMINING INFORMATION ABOUT A STATE OF A DRIVE MOTOR SYSTEM AND/OR OF A DRIVE BATTERY PACK OF A GARDENING, FORESTRY AND/OR CONSTRUCTION DEVICE

(71) Applicant: Andreas Stihl AG & Co. KG, Waiblingen (DE)

(72) Inventors: Christian Sigle, Weinstadt (DE); Simon Trinkle, Kaisersbach (DE); Claus Naegele, Stuttgart (DE); Nils Conrad, Korb (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 17/457,200

(22) Filed: Dec. 1, 2021

(65) Prior Publication Data

US 2022/0170425 A1    Jun. 2, 2022

(30) Foreign Application Priority Data

Dec. 2, 2020    (EP) .................................... 20211296

(51) Int. Cl.
*A01G 3/08*    (2006.01)
*F02B 63/02*    (2006.01)
(Continued)

(52) U.S. Cl.
CPC ........... *F02D 41/042* (2013.01); *A01G 3/086* (2013.01); *F02B 63/02* (2013.01); *F02D 29/00* (2013.01); *F02D 2400/06* (2013.01)

(58) Field of Classification Search
CPC .... F02B 63/02; F02D 41/042; F02D 2400/06; F02P 11/00; F02P 11/02
(Continued)

(56) References Cited

U.S. PATENT DOCUMENTS 5,936,820 A * 8/1999 Umemura ............. B60L 3/0023
                                                    361/25
6,460,626 B2   10/2002 Carrier
(Continued)

FOREIGN PATENT DOCUMENTS

DE              34 22 485 A1    12/1985
DE     10 2009 054 400 A1     8/2011
(Continued)

OTHER PUBLICATIONS

Extended European Search Report issued in European Application No. 20211296.7 dated May 10, 2021 (11 pages).
(Continued)

*Primary Examiner* — Erick R Solis
(74) *Attorney, Agent, or Firm* — Crowell & Moring LLP

(57) ABSTRACT

A method for determining information (Info) about a state (Z) of a drive motor system (2) and/or of a drive battery pack (11) of a gardening, forestry and/or construction device (1), includes the steps of: acquiring at least one sensor temperature (TS) of at least one temperature component (3) of the drive motor system (2) and/or of the drive battery pack (11) by way of at least one component temperature sensor (4) at the same time as and/or at a time after operation of the drive motor system (2) and/or of the drive battery pack (11) and/or of a heater (300) and/or of a cooler (310) and/or of a fan (Continued)

(320) for heating and/or for cooling the drive battery pack (11), wherein the temperature component (3) heats up or cools down due to the operation; ascertaining operating data (BD) of the operation, wherein the operating data (BD) are of a different kind than the sensor temperature (TS); comparing the acquired sensor temperature (TS) or a variable based on the sensor temperature and the ascertained operating data (BD) or a variable (TM) based on the operating data (BD) by way of a temperature model (MOD), wherein the temperature model (MOD) is based on at least one model state (AZyes) of the drive motor system (2) and/or of the drive battery pack (11); and determining the information (Info) on the basis of a result of the comparison.

16 Claims, 6 Drawing Sheets

(51) Int. Cl.
*F02D 41/04* (2006.01)
*F02D 29/00* (2006.01)

(58) Field of Classification Search
USPC .................. 123/198 D, 198 DB, 198 DC
See application file for complete search history.

(56) References Cited

U.S. PATENT DOCUMENTS

| | | | |
|---|---|---|---|
| 7,551,411 B2 | 6/2009 | Woods et al. | |
| 7,622,879 B2* | 11/2009 | Hirasawa | H02P 29/032 361/25 |
| 7,817,384 B2 | 10/2010 | Woods et al. | |
| 8,661,951 B2 | 3/2014 | Gorenflo | |
| 8,975,852 B2 | 3/2015 | Petersson et al. | |
| 10,209,700 B2* | 2/2019 | Tajima | B23Q 11/14 |
| 10,331,088 B2 | 6/2019 | Boeck et al. | |
| 10,461,674 B2 | 10/2019 | Yabuguchi et al. | |
| 11,307,102 B2* | 4/2022 | Bökelund | G01K 15/007 |
| 2002/0149895 A1* | 10/2002 | Greenberg | H05B 45/56 361/103 |
| 2002/0157620 A1* | 10/2002 | Kastner | F01P 11/14 123/41.1 |
| 2003/0067507 A1* | 4/2003 | Anzai | B41J 19/202 347/17 |
| 2003/0101947 A1* | 6/2003 | Ries-Mueller | F01P 7/12 123/41.05 |
| 2014/0207273 A1* | 7/2014 | Tsutsumi | G05B 19/4063 700/177 |
| 2015/0204758 A1 | 7/2015 | Schnell et al. | |
| 2016/0089759 A1* | 3/2016 | Morita | F16H 61/42 700/173 |
| 2016/0311094 A1 | 10/2016 | Mergener et al. | |
| 2019/0010880 A1 | 1/2019 | Eberle et al. | |
| 2020/0011820 A1 | 1/2020 | Tanaka et al. | |
| 2020/0362867 A1* | 11/2020 | Fox | F04D 15/0245 |
| 2021/0276208 A1* | 9/2021 | Verstege | B26B 19/388 |

FOREIGN PATENT DOCUMENTS

| | | |
|---|---|---|
| DE | 10 2011 103 797 A1 | 12/2012 |
| DE | 10 2012 211 580 A1 | 1/2014 |
| DE | 10 2012 112 833 A1 | 6/2014 |
| DE | 10 2012 224 429 A1 | 7/2014 |
| DE | 20 2013 101 812 U1 | 9/2014 |
| DE | 10 2013 212 022 A1 | 1/2015 |
| DE | 10 2014 209 032 A1 | 7/2015 |
| DE | 10 2015 217 053 A1 | 3/2017 |
| DE | 10 2017 118 216 A1 | 2/2018 |
| DE | 10 2017 201 565 A1 | 8/2018 |
| EP | 1 017 149 A2 | 7/2000 |
| EP | 2 087 973 B1 | 8/2012 |
| EP | 2 484 494 A2 | 8/2012 |
| EP | 3 591 836 A1 | 1/2020 |
| WO | WO 2011/040845 A1 | 4/2011 |

OTHER PUBLICATIONS

Cover page of EP 2 484 003 A0 published Aug. 8, 2012 (three (3) page).

\* cited by examiner

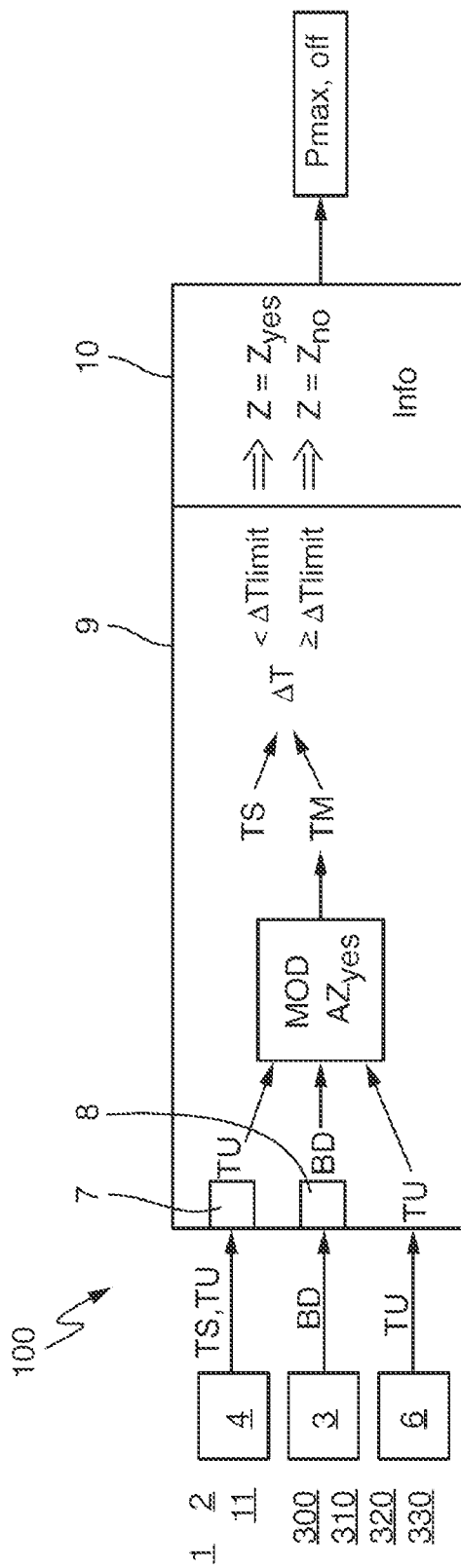

METHOD FOR DETERMINING INFORMATION ABOUT A STATE OF A DRIVE MOTOR SYSTEM AND/OR OF A DRIVE BATTERY PACK OF A GARDENING, FORESTRY AND/OR CONSTRUCTION DEVICE, AND SYSTEM FOR DETERMINING INFORMATION ABOUT A STATE OF A DRIVE MOTOR SYSTEM AND/OR OF A DRIVE BATTERY PACK OF A GARDENING, FORESTRY AND/OR CONSTRUCTION DEVICE

CROSS REFERENCE TO RELATED APPLICATION

This application claims priority under 35 U.S.C. § 119 from European Patent Application No. 20211296.7, filed Dec. 2, 2020, the entire disclosure of which is herein expressly incorporated by reference.

BACKGROUND AND SUMMARY OF THE INVENTION

The invention relates to a method for determining information about a state of a drive motor system and/or of a drive battery pack of a gardening, forestry and/or construction device, and to a system for determining information about a state of a drive motor system and/or of a drive battery pack of a gardening, forestry and/or construction device.

The invention is based on the problem of providing a method for determining information about a state of a drive motor system and/or of a drive battery pack of a gardening, forestry and/or construction device and a system for determining information about a state of a drive motor system and/or of a drive battery pack of a gardening, forestry and/or construction device, wherein the method and the system each have improved properties, in particular more functionalities.

The invention solves this problem by providing a method and a system in accordance with the independent claims. Advantageous developments and/or embodiments of the invention are described in the dependent claims.

The in particular automatic method according to the invention is designed or configured or intended to in particular automatically determine information, in particular a value of the information, about an in particular assumed and/or actual state, in particular a value of the state, of a drive motor system and/or of a drive battery pack of a gardening, forestry and/or construction device. The method comprises or involves the following steps: Acquiring, in particular automatically and/or directly acquiring, at least one sensor temperature, in particular a value of the sensor temperature, of at least one temperature component of the drive motor system and/or of the drive battery pack by way of at least one in particular electrical component temperature sensor, in particular of the drive motor system and/or of the drive battery pack and/or of the gardening, forestry and/or construction device, at the same time as and/or at a time after operation of the drive motor system and/or of the drive battery pack, in particular of the temperature component, and/or of a heater and/or of a cooler and/or of a fan for heating and/or for cooling the drive battery pack. The temperature component heats up or cools down due to the operation or as a result of the operation. In other words: The sensor temperature increases or decreases due to the operation. Ascertaining, in particular automatically and/or directly ascertaining and/or acquiring, operating data, in particular values of the operating data, of the operation, in particular at the same time as and/or at a time after the operation. The operating data are of a different kind than the sensor temperature. Comparing, in particular automatically comparing, the acquired sensor temperature or an in particular acquired variable based on the sensor temperature, in particular a value of the variable, and the ascertained operating data or an in particular acquired variable based on the operating data, in particular a value of the variable, by way of a temperature model. The temperature model is based on at least one model state or assumed state of the drive motor system and/or of the drive battery pack, in particular on a description of the model state. Determining, in particular automatically determining, the information on the basis of a result of the comparison.

The method makes it possible to indirectly determine the information, in particular the state. In other words: the information, in particular the state, does not need to or might not be determined, in particular acquired, directly. In addition or as an alternative, the method makes it possible to determine the information, in particular the state, with few means and/or means that are already present. This thus makes it possible to inexpensively determine the information, in particular the state.

The method may in particular comprise or involve: Determining the state on the basis of the result of the comparison. The method may in particular comprise or involve: Determining the information on the basis of the determined state.

The state may be determined or correct or non-determined or incorrect.

The gardening, forestry and/or construction device may be a ground-guided and/or manually guided, in particular hand-held gardening, forestry and/or construction device. In particular manually guided, in particular hand-held gardening, forestry and/or construction device may mean that the gardening, forestry and/or construction device may have a mass of at most 50 kilograms (kg), in particular of at most 20 kg, in particular of most 10 kg, in particular of at most 5 kg, and/or of at least 1 kg, in particular of at least 2 kg. In addition or as an alternative, the gardening, forestry and/or construction device may be a saw, in particular a chainsaw, or a powered pruner or a brush cutter or a blower or a grinder or a lawnmower, in particular a robotic lawnmower.

The component temperature sensor may be in thermal contact with the temperature component, in particular touch it.

The operation may be a motorized operation, in particular of the drive motor system. In addition or as an alternative, the operation may be a discharging and/or charging and/or heating and/or cooling operation of the drive battery pack. An in particular electric charger for charging the drive battery pack may in particular contain or comprise the heater and/or the cooler and/or the fan. In addition or as an alternative, the cooling may be implemented or take place only or purely by way of the fan. Again as an alternative or in addition, the heating may be implemented or take place by way of the heater and/or a charging and/or pack current and the fan.

The drive motor system and/or the drive battery pack, in particular each of them, may in particular generate heat during operation, in particular at operation.

The sensor temperature at a time after the operation may be acquired for as long, for example two hours (h) after the operation, as the temperature component is still able to be, in particular is, heated or cooled. In other words. The sensor temperature at a time after the operation may be acquired until a maximum duration limit value is reached, for example two h, after the operation, in particular and thereafter no longer.

The operating data may contain, in particular be, operating data of the drive motor system and/or of the drive battery pack, in particular of the temperature component, and/or of the heater and/or of the cooler and/or of the fan, in particular of the charger. In addition or as an alternative, the method may comprise or involve: Acquiring the operating data by way of at least one in particular electrical operating data sensor, in particular of the drive motor system and/or of the drive battery pack and/or of the gardening, forestry and/or construction device and/or of the heater and/or of the cooler and/or of the fan, in particular of the charger. Again in addition or as an alternative, the operating data do not need to or might not contain, in particular be, the sensor temperature, in particular a temperature.

The temperature model may be a temperature evolution and/or temporal profile model. In addition or as an alternative, the temperature model may be based on a determined or correct model state and/or a non-determined or incorrect model state.

The information may be determined at a time after the comparison by way of the temperature model. In addition or as an alternative, the comparison may be performed by way of the temperature model at a time after the sensor temperature has been acquired and/or the operating data have been ascertained. Again in addition or as an alternative, the operating data may be ascertained at a time before, at the same time as and/or at a time after the sensor temperature has been acquired. Again in addition or as an alternative, the sensor temperature may be acquired and/or the operating data may be ascertained, in particular multiple times, repeatedly or continually or continuously over time. Again in addition or as an alternative, the variable based on the sensor temperature and/or the variable based on the operating data, in particular each of them, may be a temporal profile or a temporal gradient or a temporal derivative, in particular made possible by repeated performance. Again in addition or as an alternative, the method may be performed in particular multiple times, repeatedly or continually or continuously over time.

In a development of the invention, the operating data are linked to an energy supply, in particular a value of the energy supply, of the operation, in particular during the operation, and/or an in particular determined or correct heat dissipation, in particular a value of the heat dissipation and/or a setpoint heat dissipation, due to the operation or caused by the operation. The operating data in particular comprise or contain an operation running duration, in particular a value of the operation running duration, and/or an operating current, in particular a value of the operating current and/or a motor current and/or a pack current, and/or an operating voltage, in particular a value of the operating voltage and/or a motor voltage and/or a pack voltage, and/or a speed, in particular a value of the speed and/or a motor speed, and/or an injection ratio, in particular a value of the injection ratio, and/or an injection quantity, in particular a value of the injection quantity, and/or a fuel quantity, in particular a value of the fuel quantity. The energy supply makes it possible, in particular the operation running duration, the operating current, the operating voltage, the speed, the injection ratio, the injection quantity and/or the fuel quantity make/makes it possible, for the temperature component to be able to heat up due to the operation, and/or for the temperature model to be able to be based on Joule heating, in particular generated by the operating current and/or switching losses, in particular generated by the operating current and the operating voltage, and/or frictional heat, in particular generated by the speed. In addition or as an alternative, the heat dissipation makes it possible, in particular the speed makes it possible, to cool the temperature component and thus for the temperature component to not be able to heat up as quickly and/or to heat up only to an equilibrium temperature value, and/or for the temperature model to be able to be based on ventilation cooling.

The drive motor system may in particular be an electric drive motor system or a combustion drive motor system.

In a development of the invention, the temperature component is an electric drive motor or a combustion drive motor or motor electronics, in particular motor power electronics, or a battery cell or pack electronics, in particular pack power electronics. The sensor temperature may in particular be a cylinder head temperature.

In a development of the invention, the method comprises or involves: Ascertaining, in particular automatically ascertaining and/or calculating, at least one model temperature, in particular a value of the model temperature, or a variable representative of the model temperature, in particular based on the model temperature, in particular a value of the variable, of the at least one temperature component based on the ascertained operating data by way of the temperature model, in particular repeatedly, in particular repeatedly multiple times. Comparing, in particular automatically comparing, the acquired sensor temperature or the variable, in particular based on the sensor temperature, with the ascertained model temperature or the ascertained variable, in particular representative of the model temperature, in particular repeatedly, in particular repeatedly multiple times. The temperature model may in particular be based on Joule heating and/or frictional heat and/or convection, in particular convection cooling, and/or ventilation cooling.

In a development, in particular one embodiment, of the invention, the method, in particular the comparison, comprises or involves: Ascertaining, in particular automatically ascertaining and/or calculating, a deviation, in particular a value of the deviation and/or a difference, of the acquired sensor temperature or the variable based on the sensor temperature and the ascertained operating data or the variable based on the operating data by way of the temperature model, in particular based on a, in particular the, determined model state, in particular from the ascertained model temperature or the variable representative of the model temperature, where ascertained, in particular repeatedly, in particular repeatedly multiple times. Determining, in particular automatically determining, the information on the basis of the ascertained deviation, in particular determining the information about either a, in particular the and/or assumed and/or actual, determined state, if the ascertained deviation is less than a deviation limit value, and/or a, in particular the and/or assumed and/or actual, non-determined state, if the ascertained deviation is equal to or greater than the deviation limit value.

In a development, in particular one embodiment, of the invention, the method comprises or involves: Lowering, in particular automatically lowering, at least one maximum permitted drive and/or charging power, in particular at least one maximum permitted value of the drive and/or charging power, in particular for at least one associated speed, in particular for at least one associated value of the speed, of the drive motor system and/or of the drive battery pack, on the basis of the determined information, in particular about the non-determined state, where or if determined. In particular deactivating, in particular automatically deactivating, the drive motor system and/or the drive battery pack, on the basis of the determined information, in particular about the non-determined state, where or if determined. This makes it possible to reduce or even to avoid a risk of damage, in particular caused by excessive heating, of the drive motor system and/or of the drive battery pack and/or of the gardening, forestry and/or construction device. The method may in particular comprise or involve: Adjusting, in particular lowering, at least one section of a power characteristic curve, in particular wherein the power characteristic curve is able to assign the maximum permitted drive and/or charging power to the at least one speed, in particular for a low speed, in particular with low heat dissipation or cooling power.

In a development, in particular one embodiment, of the invention, the in particular non-determined state is a soiled, maintenance and/or defective state.

In a development, in particular one embodiment, of the invention, the method comprises or involves the step of: Outputting, in particular automatically outputting, and/or transmitting, in particular automatically transmitting, the information. The information in particular mentions or comprises or contains the determined state and/or a lowering and/or deactivation instruction and/or a cleaning, maintenance and/or repair instruction. This makes it possible, in particular for a user, to identify the lowering of the maximum permitted drive and/or charging power, in particular the deactivation of the drive motor system and/or of the drive battery pack, as justified and/or to check on the drive motor system and/or the drive battery pack and/or the gardening, forestry and/or construction device, in particular to clean, to maintain and/or to repair it/them, in particular before it/they are able to exhibit or undergo damage. The information may in particular contain the lowering and/or deactivation instruction and/or the cleaning, maintenance and/or repair instruction, where or if the information about the non-determined state or this is determined. In addition or as an alternative, the method may comprise or involve: Determining the lowering and/or deactivation instruction and/or the cleaning, maintenance and/or repair instruction on the basis of the in particular determined non-determined state. Again in addition or as an alternative, the output may be optical, acoustic and/or haptic. Again in addition or as an alternative, the transmission may be cable-free or wireless and/or involve, in particular be, a sending operation. Again in addition or as an alternative, the information may be transmitted to an in particular electronic database, in particular of the user.

In a development, in particular one embodiment, of the invention, the method comprises or involves: Determining, in particular automatically determining, the information about the state of a state component of the drive motor system and/or of the drive battery pack on the basis of the result of the comparison. The state component is in particular a, in particular the, electric drive motor or a, in particular the, combustion drive motor, in particular a motor bearing, or, in particular the, motor electronics, in particular, in particular the, motor power electronics, or a controller or an air filter, in particular a combustion air filter and/or a cooling air filter, or an air filter grating or a cooler, in particular a heat sink, in particular cooling fins, and/or a cooling fan, in particular a fan wheel, and/or a cooler bearing, or an air inlet and/or outlet, in particular an air inlet and/or outlet opening, or a pack shaft or a, in particular the, battery cell or, in particular the, pack electronics, in particular, in particular the, pack power electronics. Such a state component having the non-determined state may generally cause excessively great heating of the temperature component due to the operation. The temperature component and the state component may in particular be identical or different, in particular of different kinds.

In one embodiment of the invention, the drive motor system and/or the drive battery pack comprise/comprises or contain/contains a plurality of state components. The method comprises or involves: Identifying, in particular automatically identifying, the state component having the non-determined state, in particular by way of varying, in particular automatically varying, at least one model parameter, in particular a value of the model parameter, of the temperature model and/or by way of an in particular extended Kalman filter. The information may in particular be about the identified state component, in particular contain or mention the state component. This may make it possible to check on the identified state component, in particular in a targeted manner.

In a development of the invention, the method comprises or involves: Ascertaining, in particular automatically and/or directly ascertaining and/or acquiring, an ambient temperature, in particular a value of the ambient temperature, of surroundings of the drive motor system and/or of the drive battery pack, in particular of the gardening, forestry and/or construction device. Comparing the acquired sensor temperature or the variable based on the sensor temperature and the ascertained operating data or the variable based on the operating data by way of the temperature model taking into consideration, in particular adding, the ascertained ambient temperature. This, in particular the surroundings, allows heat dissipation and thus makes it possible to cool the temperature component and thus makes it possible for the temperature component to not be able to heat up as quickly and/or to heat up only to an equilibrium temperature value, and/or for the temperature model to be able to be based on convection, in particular convection cooling, and/or on ventilation cooling. This thus allows an accurate comparison and/or accurate ascertainment of the model temperature or the variable representative of the model temperature, where provided, and thus accurate determination of the information, in particular of the state.

In one embodiment of the invention, the method comprises or involves: Acquiring, in particular automatically acquiring, the ambient temperature by way of the at least one component temperature sensor at a time before the operation. This makes it possible to acquire the ambient temperature using a means that is already present. This thus makes it possible to particularly inexpensively determine the information, in particular the state. The ambient temperature at a time before the operation may in particular be acquired only at a time, for example two h, after operation, when the temperature component is barely or is no longer heating up or cooling down and/or may be, in particular is, aligned with the surroundings, in particular their ambient temperature. In other words. The ambient temperature at a time before the operation may be acquired only at a time after reaching a, in particular the, maximum duration limit value, for example two h, after the operation.

In one embodiment of the invention, the method comprises or involves: Acquiring, in particular automatically acquiring, the ambient temperature by way of at least one, in particular electrical, ambient temperature sensor. The ambient temperature sensor is different from the component temperature sensor and/or isolated or separate from the temperature component, in particular the drive motor system and/or the drive battery pack, in particular the gardening, forestry and/or construction device. This makes it possible to independently acquire the ambient temperature. The gardening, forestry and/or construction device may in particular contain or comprise the ambient temperature sensor. In other words: The ambient temperature sensor may be part of the gardening, forestry and/or construction device or integrated therein.

In one embodiment of the invention, the method comprises or involves: Ascertaining, in particular automatically ascertaining and/or acquiring or predefining, a position, in particular a value of the position, of the drive motor system and/or of the drive battery pack, in particular of the gardening, forestry and/or construction device, and/or of the surroundings. Ascertaining, in particular automatically ascertaining and/or receiving, the ambient temperature on the basis of the ascertained position, in particular from an, in particular electronic, temperature database, in particular a weather app. The reception may in particular be cable-free or wireless.

The in particular electrical system according to the invention is designed or configured in particular to determine and/or to automatically determine, in particular the, information about a, in particular the, state of a, in particular the, drive motor system and/or of a, in particular the, drive battery pack of a, in particular the, gardening, forestry and/or construction device. The system comprises or contains an in particular electrical acquisition unit, an in particular electrical ascertainment unit, an in particular electrical comparison unit and an in particular electrical determination unit. The acquisition unit is in particular designed or configured to acquire and/or to automatically acquire at least one, in particular the at least one, sensor temperature of at least one, in particular the at least one, temperature component of the drive motor system and/or of the drive battery pack by way of at least one, in particular the at least one, component temperature sensor at the same time as and/or at a time after, in particular the, operation of the drive motor system and/or of the drive battery pack and/or of a, in particular the, heater and/or of a, in particular the, cooler and/or of a, in particular the fan for heating and/or for cooling the drive battery pack, wherein the temperature component heats up or cools down due to the operation. The ascertainment unit is in particular designed or configured to ascertain and/or automatically ascertain, in particular acquire, in particular the, operating data of the operation, wherein the operating data are of a different type than the sensor temperature. The comparison unit is in particular designed or configured to compare and/or to automatically compare the acquired sensor temperature or a, in particular the, variable based on the sensor temperature and the ascertained operating data or a, in particular the, variable based on the operating data by way of a, in particular the, temperature model, wherein the temperature model is based on at least one, in particular the at least one, model state of the drive motor system and/or of the drive battery pack. The determination unit is in particular designed or configured to determine and/or to automatically determine the information on the basis of a, in particular the, result of the comparison.

The system may enable the same advantage/advantages as the method mentioned above.

The system may in particular be designed or configured to in particular automatically perform a, in particular the, method as mentioned above.

The acquisition unit may comprise or contain, in particular be, the component temperature sensor.

The ascertainment unit may comprise or contain, in particular be, the operating data sensor where present.

The comparison unit and/or the determination unit, in particular each of them, may comprise or contain, in particular be, a computing unit and/or a storage unit.

The system may comprise or contain an in particular electrical output and transmission unit, wherein the output and transmission unit may be designed or configured in particular to output and/or to automatically output and/or in particular to transmit and/or to automatically transmit the information. The output and/or transmission unit may in particular comprise or contain a display, a sound generator and/or a vibration unit. In addition or as an alternative, the output and/or transmission unit may comprise or contain an in particular electrical and/or cable-free or wireless sender unit. The sender unit may in particular comprise or contain, in particular be, a UMTS, WLAN and/or Bluetooth sender unit or a sender unit based on another technology.

The system may comprise or contain an in particular electrical, mobile or portable, in particular hand-held device. The mobile device may be isolated or separate from the gardening, forestry and/or construction device. The mobile device may contain the acquisition unit, the ascertainment unit, the comparison unit, the determination unit and/or the output and transmission unit, where present. The gardening, forestry and/or construction device and the mobile device may in particular, in particular each, comprise or contain an in particular electrical and/or cable-free or wireless transmission unit for transmitting the sensor temperature and/or the operating data from the gardening, forestry and/or construction device to the mobile device. The transmission units may in particular comprise or contain, in particular be, UMTS, WLAN and/or Bluetooth transmission units or a transmission unit based on another technology. In addition or as an alternative, the mobile device may comprise or contain, in particular be, a smartphone and/or a smartwatch.

In a development of the invention, the system comprises or contains the drive motor system and/or the drive battery pack, in particular the gardening, forestry and/or construction device, and/or the heater and/or the cooler and/or the fan, in particular a, in particular the, charger for charging the drive battery pack containing or comprising the heater and/or the cooler and/or the fan, and/or an in particular electrical, mobile or portable, in particular hand-held ascertainment device. The ascertainment device is isolated or separate from the temperature component, in particular the drive motor system and/or the drive battery pack, in particular the gardening, forestry and/or construction device. The ascertainment device is in particular designed or configured to ascertain and/or to automatically ascertain, in particular acquire and/or receive, a, in particular the, ambient temperature of, in particular the, surroundings of the drive motor system and/or of the drive battery pack, in particular of the gardening, forestry and/or construction device. The comparison unit is designed or configured to compare the acquired sensor temperature or the variable based on the sensor temperature and the ascertained operating data or the variable based on the operating data by way of the temperature model taking into consideration the ascertained ambient temperature. The ascertainment device may in particular comprise or contain a, in particular the, ambient temperature sensor for acquiring the ambient temperature. In addition or as an alternative, the ascertainment device may comprise or contain an in particular electrical and/or cable-free or wireless reception unit for receiving the ambient temperature. The reception unit may in particular comprise or contain, in particular be, a UMTS, WLAN and/or Bluetooth reception unit or a reception unit based on another technology. The ascertainment device may in particular comprise or contain an in particular electrical position determination sensor, in particular a satellite position determination receiver, for ascertaining a position, in particular of the ascertainment device. The reception unit may be designed or configured to receive the ambient temperature on the basis of the ascertained position. Again in addition or as an alternative, the ascertainment device may be the mobile device. Again in addition or as an alternative, the gardening, forestry and/or construction device may contain or comprise the ascertainment device. In other words: The ascertainment device may be part of the gardening, forestry and/or construction device or integrated therein.

Further advantages and aspects of the invention arise from the claims and from the following description of preferred exemplary embodiments of the invention, which are explained below on the basis of the figures.

BRIEF DESCRIPTION OF THE DRAWINGS

FIG. 5 shows a flowchart of a method according to an embodiment of the invention performed by way of the system.

FIG. 6 shows a form of a temperature model of the system of FIG. 1 and of the method.

DETAILED DESCRIPTION OF THE DRAWINGS

Figure 1:
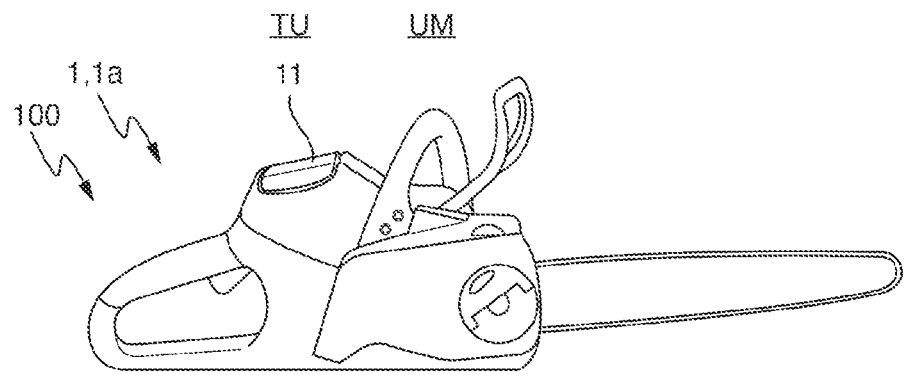
FIG. 1 shows a side view of a system according to an embodiment of the invention containing a gardening, forestry and/or construction device containing a drive motor system, in particular containing an electric drive motor, and a drive battery pack.
Figure 2:
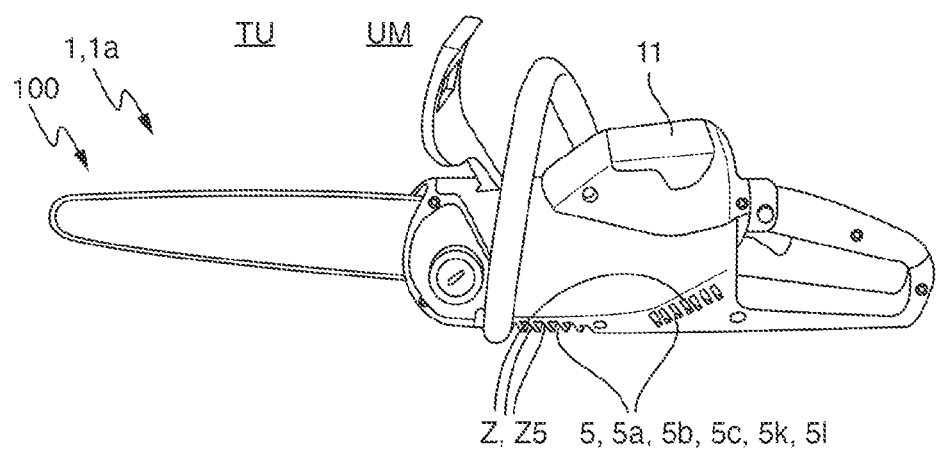
FIG. 2 shows a further side view of the system of FIG. 1.
Figure 3:
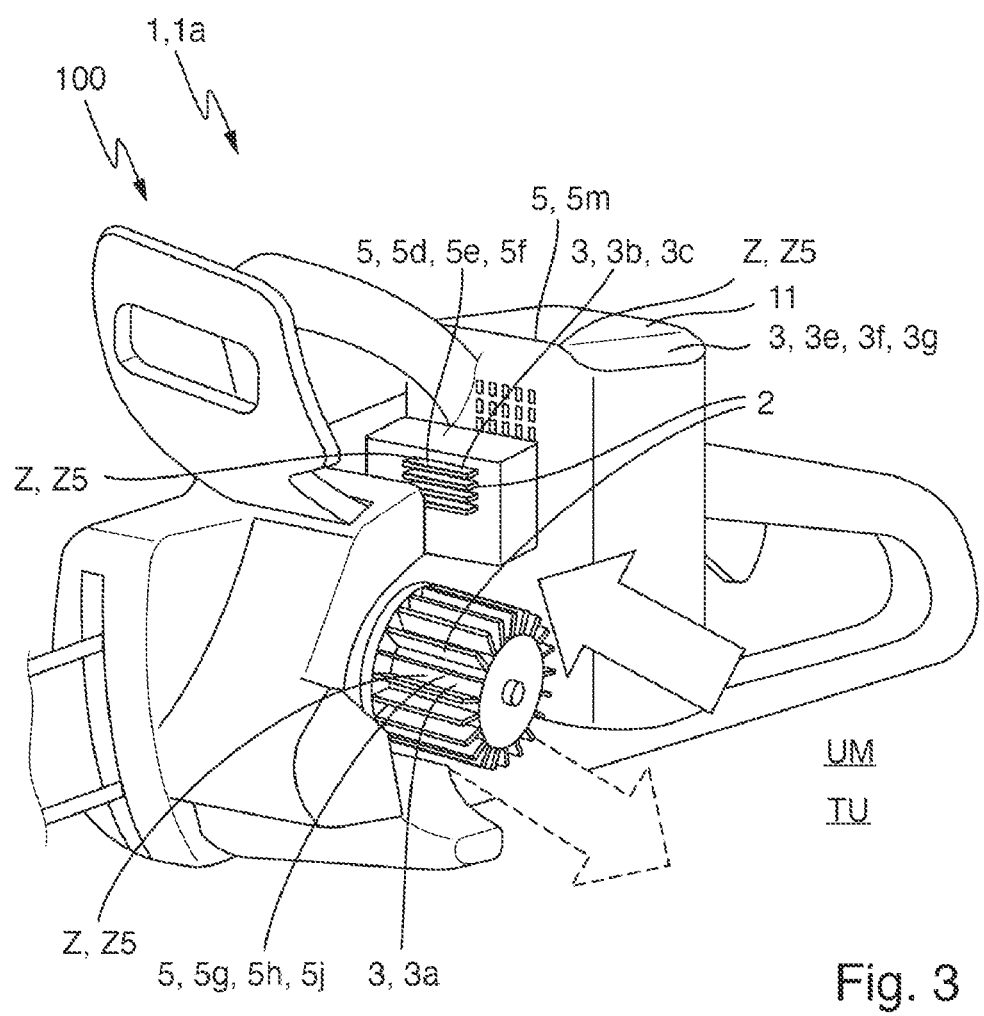
FIG. 3 shows a schematic view of a cooling air flow through the gardening, forestry and/or construction device of FIG. 1.

FIGS. 1 to 4, 5, 9 and 10 show a system 100 for determining information Info about a state Z of a drive motor system 2 and/or of a drive battery pack 11 of a gardening, forestry and/or construction device 1. The system 100 contains an acquisition unit 7, an ascertainment unit 8, a comparison unit 9 and a determination unit 10. The acquisition unit 7 is designed to acquire at least one sensor temperature TS of at least one temperature component 3 of the drive motor system 2 and/or of the drive battery pack 11 by way of at least one component temperature sensor 4 at the same time as and/or at a time after operation of the drive motor system 2 and/or of the drive battery pack 11 and/or of a heater 300 and/or of a cooler 310 and/or of a fan 320 for heating and/or for cooling the drive battery pack 11, wherein the temperature component 3 heats up or cools down due to the operation. The ascertainment unit 8 is designed to ascertain operating data BD of the operation, wherein the operating data BD are of a different kind than the sensor temperature TS. The comparison unit 9 is designed to compare the acquired sensor temperature TS or a variable based on the sensor temperature and the ascertained operating data BD or a variable TM based on the operating data BD by way of a temperature model MOD, wherein the temperature model MOD is based on at least one model state AZyes of the drive motor system 2 and/or of the drive battery pack 11. The determination unit 10 is designed to determine the information Info on the basis of a result of the comparison.

FIG. 5 shows a method for determining the information Info about the state Z of the drive motor system 2 and/or of the drive battery pack 11 of the gardening, forestry and/or construction device 2, in particular by way of the system 100. The method involves the following steps: Acquiring the at least one sensor temperature TS of the at least one temperature component 3 of the drive motor system 2 and/or of the drive battery pack 11 by way of the at least one component temperature sensor 4 at the same time as and/or at a time after the operation of the drive motor system 2 and/or of the drive battery pack 11 and/or of the heater 300 and/or of the cooler 310 and/or of the fan 320 for heating and/or for cooling the drive battery pack 11, in particular by way of the acquisition unit 7. The temperature component 3 heats up or cools down due to the operation. Ascertaining the operating data BD of the operation, in particular by way of the ascertainment unit 8. The operating data BD are of a different kind than the sensor temperature TS. Comparing the acquired sensor temperature TS or the variable based on the sensor temperature and the ascertained operating data BD or the variable TM based on the operating data BD by way of the temperature model MOD, in particular by way of the comparison unit 9. The temperature model MOD is based on the at least one model state AZyes of the drive motor system 2 and/or of the drive battery pack 11. Determining the information Info on the basis of the result of the comparison, in particular by way of the determination unit 10.

In detail, the system 100 contains the drive motor system 2 and/or the drive battery pack 11, in particular the gardening, forestry and/or construction device 1, and/or the heater 300 and/or the cooler 310 and/or the fan 320, in particular a charger 330 for charging the drive battery pack 11 containing the heater 300 and/or the cooler 310 and/or the fan 320.

In the exemplary embodiment shown, the gardening, forestry and/or construction device 1 is a saw 1a. In alternative exemplary embodiments, the gardening, forestry and/or construction device may be a powered pruner or a brush cutter or a blower or a grinder or a lawnmower, in particular a robotic lawnmower.

Figure 4:
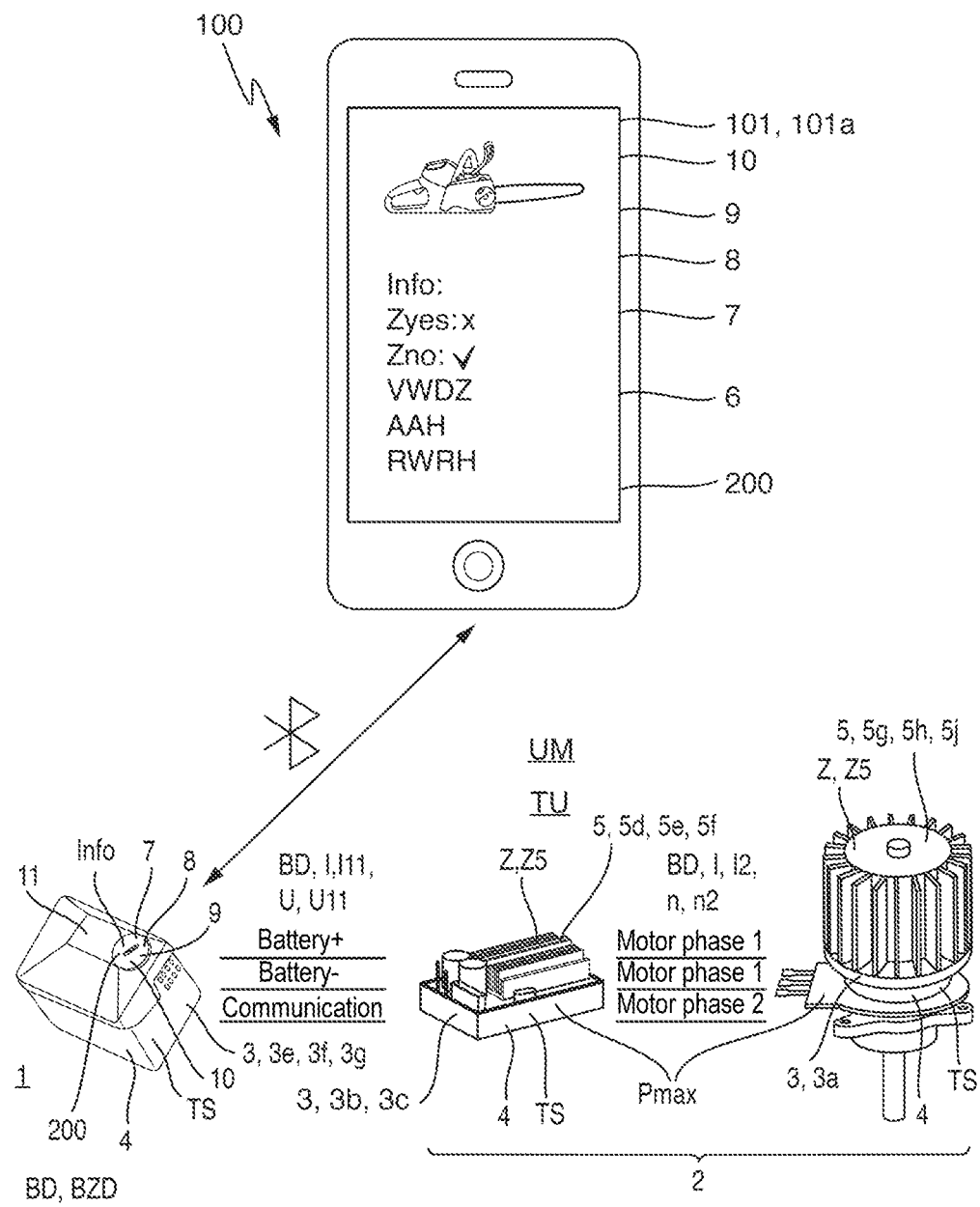
FIG. 4 shows a schematic view of the system of FIG. 1 containing a mobile ascertainment device.

The system 100 furthermore contains a mobile ascertainment device 101, in particular in the form of a smartphone 101a, as shown in FIG. 4. The ascertainment device 101 is separate from the temperature component 3, in particular the drive motor system 2 and/or the drive battery pack 11, in particular the gardening, forestry and/or construction device 1.

In the exemplary embodiment shown, the drive battery pack 11 and, thus in FIGS. 1 to 4, the gardening, forestry and/or construction device 1 and the ascertainment device 101, in particular each contain the acquisition unit 7, the ascertainment unit 8, the comparison unit 9 and the determination unit 10. In alternative exemplary embodiments, in particular either the drive motor system or the drive battery pack or the gardening, forestry and/or construction device or the ascertainment device may contain the acquisition unit, the ascertainment unit, the comparison unit and/or the determination unit.

Furthermore, in FIGS. 1 to 4 and 10, the temperature component 3 is an electric drive motor 3a or motor electronics 3b, in particular motor power electronics 3c, or a battery cell 3e or pack electronics 3f, in particular pack power electronics 3g.

Figure 9:
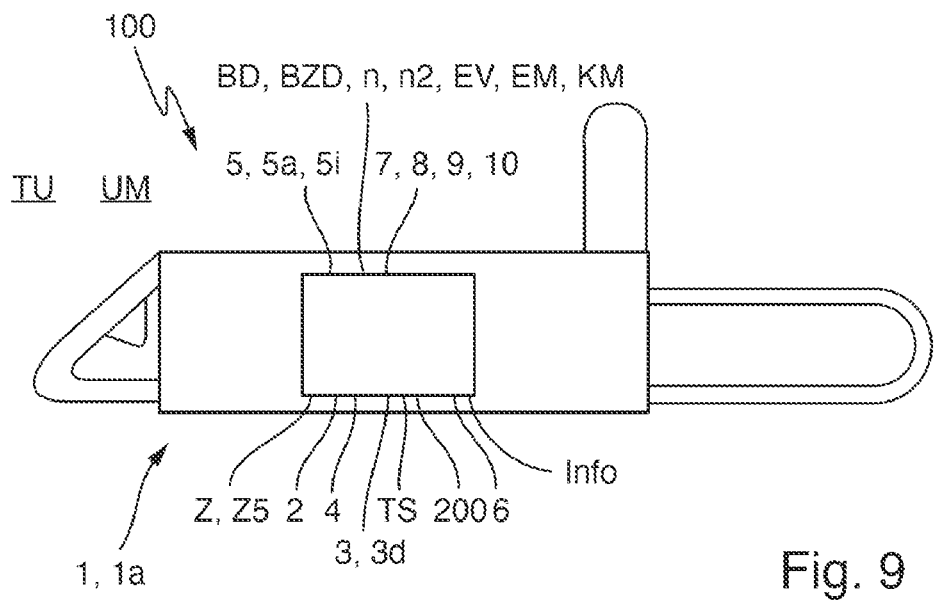
FIG. 9 shows yet another side view of the system containing a gardening, forestry and/or construction device containing a drive motor system, in particular containing a combustion drive motor.
Figure 10:
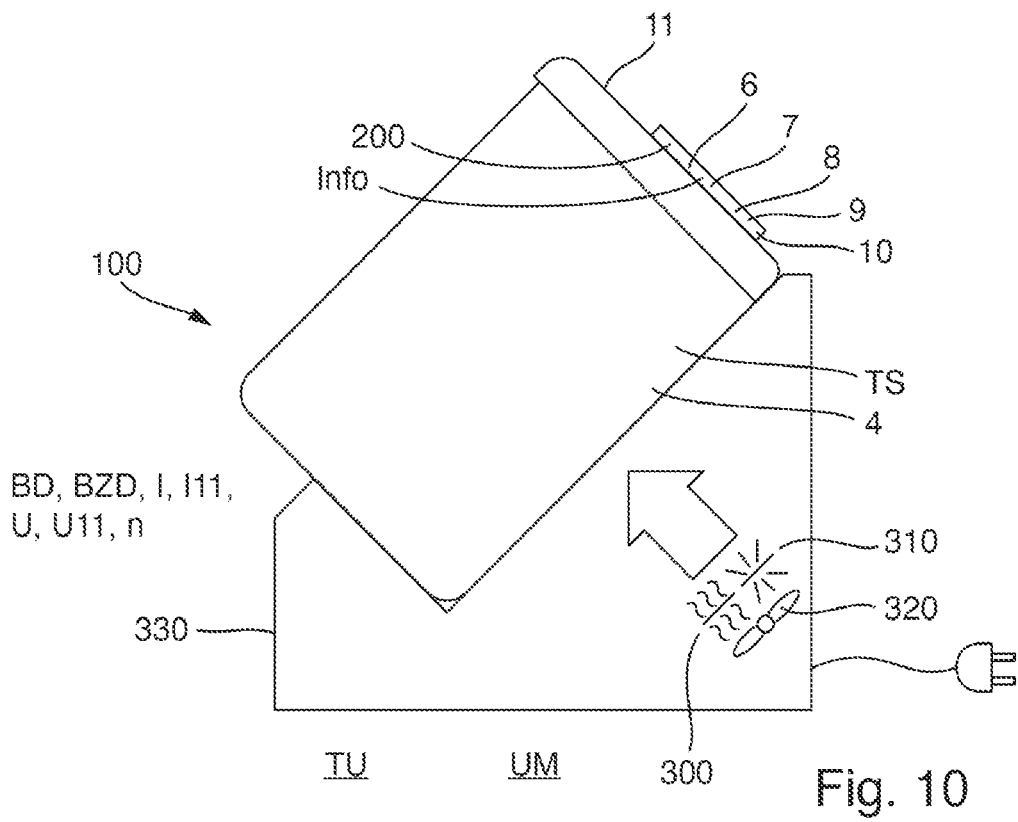
FIG. 10 shows yet another side view of the system containing a charger for charging the drive battery pack containing a heater and/or a cooler and/or a fan for heating and/or for cooling the drive battery pack.

In FIG. 9, the temperature component 3 is a combustion drive motor 3d.

Exactly four temperature components 3 are in particular present or provided in FIGS. 1 to 4. Only a single temperature component 3 is present or provided in FIG. 9. In general, only a single temperature component or at least two temperature components may be present or provided.

Furthermore, exactly three component temperature sensors 4 are present or provided in FIGS. 1 to 4. Only a single component temperature sensor 4 is present or provided in FIG. 9. In general, only a single component temperature sensor or at least two component temperature sensors may be present or provided.

The operating data BD are additionally linked to an energy supply Pzu of the operation and/or a heat dissipation Pab due to the operation, as shown in FIG. 6.

In FIGS. 1 to 4 and 10, the operating data BD in particular contain an operation running duration BZD and/or an operating current I, in particular a motor current i2 and/or a pack current I11, and/or an operating voltage U, in particular a motor voltage and/or a pack voltage U11, and/or a speed n, in particular a motor speed n2.

In FIG. 9, the operating data BD contain an operation running duration BZD and/or a speed n, in particular a motor speed n2, and/or an injection ratio EV and/or an injection quantity EM and/or a fuel quantity KM.

The method furthermore involves: Determining the information Info about the state Z5 of a state component 5 of the drive motor system 2 and/or of the drive battery pack 11 on the basis of the result of the comparison, in particular by way of the determination unit 10.

In FIGS. 1 to 4 and 10, the state component 5 is in particular the electric drive motor, in particular a motor bearing and/or a rotor and/or a stator and/or at least one coil, or the motor electronics, in particular the motor power electronics, or an air filter 5a, in particular a cooling air filter 5b, or an air filter grating 5c, or a cooler 5d, in particular a heat sink 5e, in particular cooling fins 5f, and/or a cooling fan 5g, in particular a fan wheel 5h, and/or a cooler bearing 5j, or an air inlet and/or outlet 5k, in particular an air inlet and/or outlet opening 5l, or a pack shaft 5m or the battery cell or the pack electronics, in particular the pack power electronics.

In FIG. 9, the state component 5 is the combustion drive motor, in particular a motor bearing, or a controller or an air filter 5a, in particular a combustion air filter 5i and/or a cooling air filter, or an air filter grating or a cooler, in particular a heat sink, in particular cooling fins, and/or a cooling fan, in particular a fan wheel, and/or a cooler bearing, or an air inlet and/or outlet, in particular an air inlet and/or outlet opening.

In the exemplary embodiment shown, in particular in FIGS. 1 to 4, the drive motor system 2 and/or the drive battery pack 11 contain/contains a plurality of state components 5a, 5c, 5d, 5g, 5m. In alternative exemplary embodiments, the drive motor system and/or the drive battery pack may, in particular each, contain only a single state component.

The method furthermore involves: Ascertaining an ambient temperature TU of surroundings UM of the drive motor system 2 and/or of the drive battery pack 11, in particular of the gardening, forestry and/or construction device 1, in particular by way of the system 100. Comparing the acquired sensor temperature TS or the variable based on the sensor temperature and the ascertained operating data or the variable TM based on the operating data BD by way of the temperature model MOD taking into consideration the ascertained ambient temperature TU, as shown in FIG. 6.

In detail, the method involves: Acquiring the ambient temperature TU by way of the at least one component temperature sensor 4 at a time before the operation.

The ascertainment device 101 is furthermore designed to ascertain, in particular acquire, the ambient temperature TU of the surroundings UM of the drive motor system 2 and/or of the drive battery pack 11, in particular of the gardening, forestry and/or construction device 1, as shown in FIG. 4. The comparison unit 9 is designed to compare the acquired sensor temperature TS or the variable based on the sensor temperature and the ascertained operating data BD or the variable TM based on the operating data BD by way of the temperature model MOD taking into consideration the ascertained ambient temperature TU.

In the exemplary embodiment shown, the ascertainment device 101 contains an ambient temperature sensor 6 for acquiring the ambient temperature TU.

The method additionally involves: Acquiring the ambient temperature TU by way of the at least one ambient temperature sensor 6. The ambient temperature sensor 6 is different from the component temperature sensor 4 and/or separate from the temperature component 3, in particular the drive motor system 2 and/or the drive battery pack 11, in particular the gardening, forestry and/or construction device 1.

In alternative exemplary embodiments, the method may additionally or alternatively involve: Receiving the ambient temperature, in particular by way of the ascertainment device.

In addition or as an alternative, in alternative exemplary embodiments, it may be sufficient to acquire the ambient temperature by way of in particular either the component temperature sensor or the ambient temperature sensor or to ascertain it, in particular to acquire it, by way of the ascertainment device.

In the exemplary embodiment shown, the ambient temperature TU acquired by way of the component temperature sensor 4 and the ambient temperature TU acquired by way of the ambient temperature sensor 6 are averaged. The comparison is performed taking into consideration the averaged ambient temperature TU.

This may in particular be performed under the condition that the ambient temperature TU acquired by way of the component temperature sensor 4 and the ambient temperature TU acquired by way of the ambient temperature sensor 6 have only a small variance (a high variance signifies heating in the sun, cooling/heating caused by a position change, etc.).

Figure 7:
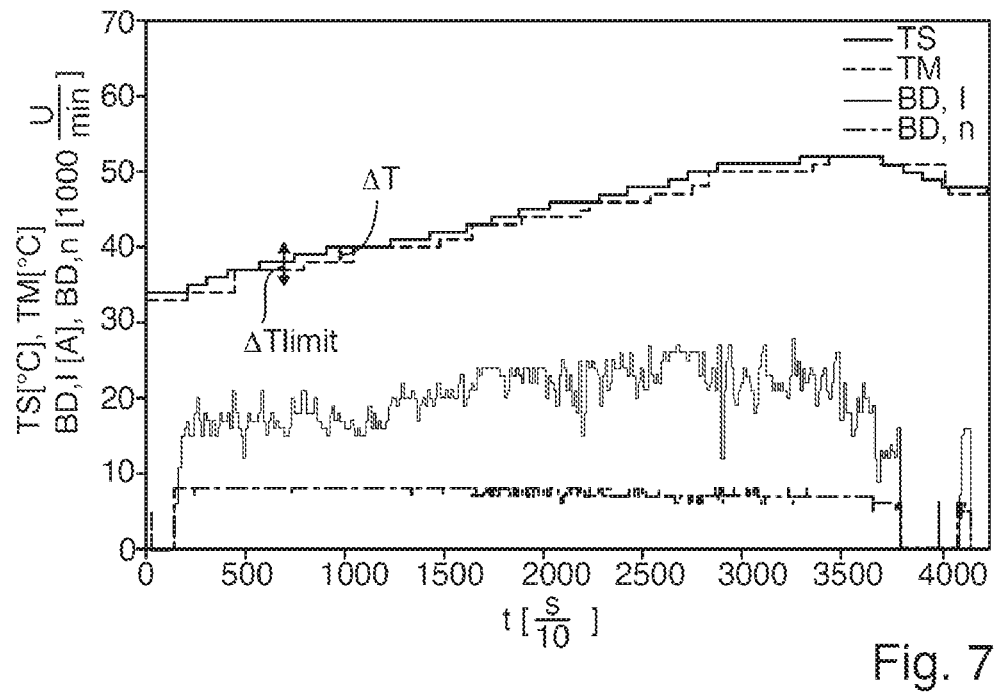
FIG. 7 shows a profile of a sensor temperature and of operating data of the drive motor system and/or of the drive battery pack of FIG. 1 having a determined state and a model temperature based on the operating data over time.
Figure 8:
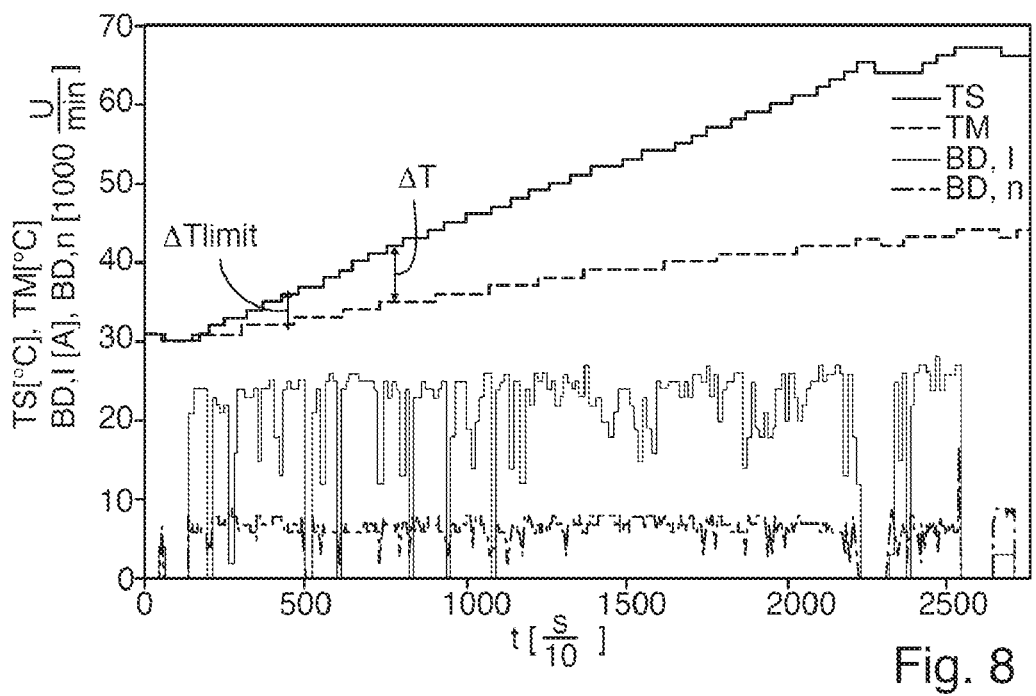
FIG. 8 shows a profile of a sensor temperature and of operating data of the drive motor system and/or of the drive battery pack of FIG. 1 having a non-determined state and a model temperature based on the operating data over time.

The method furthermore involves: Ascertaining, in particular calculating, at least one model temperature TM or a variable representative of the model temperature of the at least one temperature component 3 based on the ascertained operating data BD by way of the temperature model MOD, as shown in FIG. 6, in particular by way of the comparison unit 9. Comparing the acquired sensor temperature TS or the variable with the ascertained model temperature TM or the ascertained variable, as shown in FIGS. 7 and 8, in particular by way of the comparison unit 9.

In the exemplary embodiment shown, in particular for FIGS. 1 and 4, the model temperature TM is ascertained, in particular calculated, by way of the temperature model MOD shown in FIG. 6, at a time t+1 based on the model temperature TM at a temporally preceding time t, in particular a unit of time or a spacing period Δt temporally beforehand, and on the ascertained operating data BD, in particular for the unit of time Δt, in particular repeatedly multiple times or in finite steps. The temperature model MOD or the formula is based on the energy supply PU and the heat dissipation Pab. In detail, the temperature model MOD or the formula, in particular the energy supply PU, is based on Joule heating, in particular generated by the operating current I, in particular the pack current I11, and switching losses, in particular generated by the operating current I, in particular the motor current I2, and the operating voltage U, in particular the pack voltage U11, and frictional heat, in particular generated by the speed n, in particular the motor speed n2. The temperature model MOD or the formula, in particular the heat dissipation Pab, in particular to the surroundings, is furthermore based on convection, in particular convection cooling, in particular by the surroundings, in particular at the ambient temperature TU, and ventilation cooling, in particular by the surroundings, in particular at the ambient temperature TU, and the speed n, in particular the motor speed n2.

The Joule heating is in particular ascertained or taken into consideration by two model parameters c1 and c6 of the temperature model MOD. The frictional heat is ascertained or taken into consideration by a model parameter c2. The convection cooling is ascertained or taken into consideration by a model parameter c3. The ventilation cooling is ascertained or taken into consideration by a model parameter c4. A thermal capacity (fixed constant for the corresponding temperature component 3) is additionally ascertained or taken into consideration by a model parameter c5, in particular in order to be able to ascertain, in particular calculate, a change in the model temperature TM per unit of time Δt.

The method furthermore involves: Ascertaining, in particular calculating, a deviation ΔT of the acquired sensor temperature TS or the variable based on the sensor temperature and the ascertained operating data BD or the variable TM based on the operating data BD by way of the temperature model MOD, in particular based on a determined model state AZyes, in particular from the ascertained model temperature TM or the variable representative of the model temperature, in particular repeatedly multiple times or in finite steps, as shown in FIGS. 7 and 8, in particular by way of the comparison unit 9. Determining the information Info on the basis of the ascertained deviation ΔT, in particular by way of the determination unit 10. In particular determining the information Info about either a determined state Zyes, if the ascertained deviation ΔT is less than a deviation limit value ΔTlimit, in particular of for example five degrees Celsius, and/or a non-determined state Zno, if the ascertained deviation ΔT is equal to or greater than the deviation limit value ΔTlimit.

In FIG. 7, the sensor temperature TS corresponds to, in particular matches, the model temperature TM. The deviation ΔT is thus less than the deviation limit value ΔTlimit. The information Info about the determined state Zyes is thus determined.

In FIG. 8, the sensor temperature TS deviates from the model temperature TM; the sensor temperature TS is in particular higher than the model temperature TM, in particular over time. The deviation ΔT is thus equal to or greater than the deviation limit value ΔTlimit, in particular after a time of for example sixty seconds. The information Info about the non-determined state Zno is thus determined.

In the exemplary embodiment shown, the deviation ΔT of the sensor temperature TS from the model temperature TM is ascertained, in particular calculated. The deviation limit value ΔTlimit is predefined such that the information Info about the determined state Zyes and/or the non-determined state Zno is able to be determined in a reliable manner.

In alternative exemplary embodiments, a change over time, in particular an increase, in the sensor temperature and a change over time, in particular increase, in the model temperature may be compared; a deviation in the changes may in particular be ascertained, in particular calculated. This may make it possible, in particular in the case shown in FIG. 8, for firstly the deviation to be equal to or greater than the deviation limit value in a shorter time, for example after twenty seconds, and secondly for the deviation limit value to still be able to be predefined such that the information, in particular about the non-determined state, is able to be determined in a reliable manner.

In addition or as an alternative, in alternative exemplary embodiments, the information, in particular about the non-determined state, may be determined on the basis of an extent to which the deviation exceeds the deviation limit value, for example from greater than zero percent to one hundred percent non-determined state.

In addition, the in particular non-determined state Z, Zno is a soiled, maintenance and/or defective state VWDZ.

In FIG. 7, the state Z is the determined state Zyes. The drive motor system 2 and/or the drive battery pack 11, in particular the one or more state components 5, are/is in particular clean, maintenance-free and non-defective or intact. The energy supply Pzu and the heat dissipation Pab are thus, in particular each, as determined. The sensor temperature TS thus corresponds to the model temperature TM.

In FIG. 8, the state Z is the non-determined state Zno. The drive motor system 2 and/or the drive battery pack 11, in particular the one or more state components 5, are/is in particular soiled or dirty, needing maintenance and/or defective. The energy supply Pzu and/or the heat dissipation Pab are thus, in particular each, not as determined. The energy supply Pzu is in particular higher than determined and/or the heat dissipation Pab is less or lower than determined. The sensor temperature TS thus deviates from the model temperature TM; the sensor temperature TS is in particular higher than the model temperature TM.

The model temperature TM may in particular, in particular still, be set to the, in particular then current, sensor temperature TS at a time after a predefined or certain period or a predefined or particular event (for example stationary state, excessively low or small speed, excessively low or small load, etc.). This may make it possible to counteract drifting of the model temperature TM, in particular due to simplification of reality by the temperature model MOD.

The method furthermore involves: Lowering at least one maximum permitted drive and/or charging power Pmax, in particular for at least one associated speed n, of the drive motor system 2 and/or of the drive battery pack 11, in particular deactivating the drive motor system 2 and/or the drive battery pack 11, on the basis of the determined information Info, in particular about the non-determined state Zno, in particular by way of the system 100, in particular by way of the determination unit 10.

The system 100 furthermore contains, in particular the drive motor system 2 and/or the drive battery pack 11 and/or the gardening, forestry and/or construction device 1 and/or the ascertainment device 101, in particular each, contain/contains an output and transmission unit 200 for outputting and/or for transmitting the information Info, as shown in FIG. 4.

The method furthermore involves the step of: Outputting and/or transmitting the information Info, in particular by way of the output and transmission unit 200. The information Info in particular contains the determined state Z and/or a lowering and/or deactivation instruction AAH and/or a cleaning, maintenance and/or repair instruction RWRH.

The method additionally involves: Identifying the state component $5a$, $5c$, $5d$, $5g$, $5m$ having the non-determined state Zno, in particular by way of varying the at least one model parameter $c1$, $c2$, $c3$, $c4$, $c5$, $c6$ of the temperature model MOD and/or by way of an in particular extended Kalman filter KF, in particular by way of the comparison unit 9.

In the exemplary embodiment shown, the information is in particular about the identified state component; the information Info in particular contains the state component.

By way of example, the air filter $5a$ may be soiled, in particular blocked, and thus not be able to be flowed through correctly, the air filter grating $5c$ may be soiled, in particular blocked, and thus not be able to be flowed through correctly, the cooler $5d$ may be soiled, in particular dirty, and thus not be able to dissipate heat correctly, the cooling fan $5g$ may be defective and thus not be able to dissipate heat and/or generate heat correctly, and/or the pack shaft $5m$ may be soiled, in particular blocked, and thus not be able to be flowed through correctly.

The convection cooling and/or the ventilation cooling may furthermore for example be not as determined, in particular less or lower, and/or the Joule heating and/or the frictional heat may be not as determined, in particular higher.

A plurality of temperature models MOD may in particular be provided or present for, in particular each of, the plurality of temperature components 3. The temperature models MOD may, in particular each, be parameterized for the temperature components 3, in particular such that they replicate the temperature behaviour for different states Z, Zyes, Zno of the drive motor system 2 and/or the drive battery pack 11.

For the rest, the gardening, forestry and/or construction device 1 and the ascertainment device 101 are designed to interact, in particular do interact, in particular are connected in terms of signalling.

As made clear by the exemplary embodiments shown and explained above, the invention provides an advantageous method for determining information about a state of a drive motor system and/or of a drive battery pack of a gardening, forestry and/or construction device and an advantageous system for determining information about a state of a drive motor system and/or of a drive battery pack of a gardening, forestry and/or construction device, wherein the method and the system each have improved properties, in particular more functionalities.

What is claimed is:

1. A method for determining information (Info) about a state of an electric drive motor system and/or of a drive battery pack of a gardening, forestry and/or construction device, the method comprising the steps of:

acquiring at least one sensor temperature (TS) of at least one temperature component of the electric drive motor system and/or of the drive battery pack by way of at least one component temperature sensor at the same time as and/or at a time after operation of at least one of: the electric drive motor system, the drive battery pack, or a heater, cooler or fan for heating and/or cooling the drive battery pack, wherein the temperature component heats up or cools down due to the operation;

ascertaining operating data (BD) of the operation, wherein the operating data (BD) are of a different kind than the sensor temperature (TS);

comparing the acquired sensor temperature (TS) or a variable based on the sensor temperature and the ascertained operating data (BD) or a variable (TM) based on the operating data (BD) by way of a temperature model (MOD), wherein the temperature model (MOD) is based on at least one model state (AZyes) of the electric drive motor system and/or of the drive battery pack; and determining the information (Info) on the basis of a result of the comparison,
wherein the operating data (BD) are linked to: an energy supply (Pzu) of the operation and/or a heat dissipation (Pab) due to the operation,
wherein the operating data (BD) contain at least one of: an operating current (I), an operating voltage (U), or a speed (n), and
wherein the temperature component is an electric drive motor, motor electronics, a battery cell, or pack electronics.

2. The method according to claim 1,
wherein the operating data (BD) contain an operation running duration (BZD).

3. The method according to claim 1, further comprising:
ascertaining at least one model temperature (TM) or a variable representative of the model temperature of the at least one temperature component based on the ascertained operating data (BD) by way of the temperature model (MOD); and
comparing the acquired sensor temperature (TS) or the variable with the ascertained model temperature (TM) or the ascertained variable.

4. The method according to claim 3, further comprising:
ascertaining a deviation ($\Delta T$) of the acquired sensor temperature (TS) or the variable based on the sensor temperature and the ascertained operating data (BD) or the variable (TM) based on the operating data (BD) by way of the temperature model (MOD), based on a determined model state (Zyes) from the ascertained model temperature (TM) or the variable representative of the model temperature; and
determining the information (Info) on the basis of the ascertained deviation ($\Delta T$), by determining the information (Info) about a determined state (Zyes) if the ascertained deviation ($\Delta T$) is less than a deviation limit value ($\Delta T$limit), and/or about a non-determined state (Zno) if the ascertained deviation ($\Delta T$) is equal to or greater than the deviation limit value ($\Delta T$limit).

5. The method according to claim 4, further comprising:
lowering at least one maximum permitted drive and/or charging power (Pmax), for at least one associated speed (n), of the drive motor system and/or of the drive battery pack, on the basis of the determined information (Info) about the non-determined state (Zno).

6. The method according to claim 5, wherein the lowering comprises deactivating the drive motor system and/or the drive battery pack.

7. The method according to claim 4,
wherein the non-determined state (Z, Zno) is a soiled, maintenance and/or defective state (VWDZ).

8. The method according to claim 5, further comprising:
outputting and/or transmitting the information (Info), wherein the information (Info) contains at least one of: the determined state (Z), a lowering and/or deactivation instruction (AAH), or a cleaning, maintenance and/or repair instruction (RWRH).

9. The method according to claim 1, further comprising:
determining the information (Info) about the state (Z5) of a state component of the drive motor system and/or of the drive battery pack on the basis of the result of the comparison, wherein the state component is an electric drive motor, motor electronics, a controller, an air filter, an air filter grating, a cooler, an air inlet and/or outlet, a pack shaft, a battery cell or pack electronics.

10. The method according to claim 9,
wherein the state component is:
a motor bearing, a rotor, a stator or at least one coil of the drive motor, or
motor power electronics, or
a cooling air filter, or
cooling fins, a fan wheel, or a cooler bearing, or
an air inlet and/or outlet opening, or
pack power electronics.

11. The method according to claim 9,
wherein the drive motor system and/or the drive battery pack contain/contains a plurality of state components, and
wherein the method further comprises:
identifying the state component having a non-determined state (Z5no), by way of varying at least one model parameter ($c_1$, $c_2$, $c_3$, $c_4$, $c_5$, $c_6$) of the temperature model (MOD) and/or by way of an extended Kalman filter (KF).

12. The method according to claim 1, further comprising:
ascertaining an ambient temperature (TU) of surroundings (UM) of the drive motor system and/or of the drive battery pack, of the gardening, forestry and/or construction device; and
comparing the acquired sensor temperature (TS) or the variable based on the sensor temperature and the ascertained operating data (BD) or the variable (TM) based on the operating data (BD) by way of the temperature model (MOD) taking into consideration the ascertained ambient temperature (TU).

13. The method according to claim 12, further comprising:
acquiring the ambient temperature (TU) by way of the at least one component temperature sensor at a time before the operation.

14. The method according to claim 12, further comprising:
acquiring the ambient temperature (TU) by way of at least one ambient temperature sensor, wherein the ambient temperature sensor is different from the component temperature sensor and/or separate from the temperature component.

15. A system for determining information (Info) about a state (Z) of an electric drive motor system and/or of a drive battery pack of a gardening, forestry and/or construction device, the system comprising:
an acquisition unit, wherein the acquisition unit is designed to acquire at least one sensor temperature (TS) of at least one temperature component of the electric drive motor system and/or of the drive battery pack by way of at least one component temperature sensor at the same time as and/or at a time after operation of at least one of: the electric drive motor system, the drive battery pack, or a heater, cooler or a fan for heating and/or cooling the drive battery pack, wherein the temperature component heats up or cools down due to the operation;
an ascertainment unit, wherein the ascertainment unit is designed to ascertain operating data (BD) of the operation, wherein the operating data (BD) are of a different kind than the sensor temperature (TS);
a comparison unit, wherein the comparison unit is designed to compare the acquired sensor temperature (TS) or a variable based on the sensor temperature and the ascertained operating data (BD) or a variable (TM) based on the operating data (BD) by way of a temperature model (MOD), wherein the temperature model (MOD) is based on at least one model state (AZyes) of the electric drive motor system and/or of the drive battery pack; and
a determination unit, wherein the determination unit is designed to determine the information (Info) on the basis of a result of the comparison,
wherein the operating data (BD) are linked to: an energy supply (Pzu) of the operation and/or a heat dissipation (Pab) due to the operation,
wherein the operating data (BD) contain at least one of: an operating current (I), an operating voltage (U), or a speed (n), and
wherein the temperature component is an electric drive motor, motor electronics, a battery cell, or pack electronics.

16. The system according to claim 15, further comprising at least one of:
the drive motor system, the drive battery pack, the heater, the cooler, the fan, or a charger for charging the drive battery pack containing the heater, the cooler and/or the fan; or
a mobile ascertainment device, wherein the mobile ascertainment device is separate from the temperature component, and wherein the mobile ascertainment device is designed to ascertain an ambient temperature (TU) of surroundings (UM) of the drive motor system and/or of the drive battery pack, and wherein the comparison unit is designed to compare the acquired sensor temperature (TS) or the variable based on the sensor temperature and the ascertained operating data (BD) or the variable (TM) based on the operating data (BD) by way of the temperature model (MOD) taking into consideration the ascertained ambient temperature (TU).

* * * * *